(12) United States Patent
Kimura

(10) Patent No.: US 10,309,350 B2
(45) Date of Patent: Jun. 4, 2019

(54) AIR CLEANER FOR INTERNAL COMBUSTION ENGINE

(71) Applicant: TOYOTA BOSHOKU KABUSHIKI KAISHA, Aichi-ken (JP)

(72) Inventor: Ryusuke Kimura, Ichinomiya (JP)

(73) Assignee: TOYOTA BOSHOKU KABUSHIKI KAISHA, Aichi-Ken (JP)

(*) Notice: Subject to any disclaimer, the term of this patent is extended or adjusted under 35 U.S.C. 154(b) by 0 days.

(21) Appl. No.: 15/862,122

(22) Filed: Jan. 4, 2018

(65) Prior Publication Data

US 2018/0195471 A1 Jul. 12, 2018

(30) Foreign Application Priority Data

Jan. 12, 2017 (JP) .................................. 2017-003611

(51) Int. Cl.
| | | |
|---|---|---|
| *F02M 35/00* | (2006.01) | |
| *F02M 25/08* | (2006.01) | |
| *F02M 35/02* | (2006.01) | |
| *B01D 46/00* | (2006.01) | |
| *F02M 35/024* | (2006.01) | |
| *B01D 46/10* | (2006.01) | |
| *B01D 46/52* | (2006.01) | |

(52) U.S. Cl.
CPC ..... *F02M 35/0203* (2013.01); *B01D 46/0036* (2013.01); *B01D 46/10* (2013.01); *B01D 46/521* (2013.01); *F02M 25/0854* (2013.01); *F02M 35/0218* (2013.01); *F02M 35/02458* (2013.01); *B01D 2253/102* (2013.01); *B01D 2259/4516* (2013.01); *B01D 2279/60* (2013.01)

(58) Field of Classification Search
CPC ........... F02M 35/0203; F02M 35/0218; F02M 35/02458; F02M 25/0854; B01D 46/0036; B01D 46/10; B01D 46/521
USPC ........... 123/518, 198 E; 96/135; 55/449, 500
See application file for complete search history.

(56) References Cited

U.S. PATENT DOCUMENTS

| | | | | |
|---|---|---|---|---|
| 5,120,334 A | * | 6/1992 | Cooper | ................. F02B 61/045 123/198 E |
| 2002/0069625 A1 | * | 6/2002 | Stass | ................. F02M 35/0203 55/385.3 |
| 2007/0022880 A1 | * | 2/2007 | Mizutani | ............ B01D 46/0036 96/136 |
| 2017/0138322 A1 | * | 5/2017 | Cho | ....................... B01D 53/02 |

FOREIGN PATENT DOCUMENTS

JP 2007-32409 2/2007

* cited by examiner

*Primary Examiner* — Mahmoud Gimie
(74) *Attorney, Agent, or Firm* — Greenblum & Bernstein, P.L.C.

(57) ABSTRACT

A housing of an air cleaner includes a housing body, which has a wall portion formed of a plastic molding and is configured such that an opening is formed in a part of the wall portion, and an adsorption sheet, which is fixed to a peripheral portion of the opening and closes the opening. The adsorption sheet includes an outer fiber molding, an inner fiber molding, which is provided at a position inward of the outer fiber molding, and an adsorbent, which is located between the outer fiber molding and the inner fiber molding and adsorbs fuel vapor of the internal combustion engine.

6 Claims, 5 Drawing Sheets

US 10,309,350 B2

AIR CLEANER FOR INTERNAL COMBUSTION ENGINE

BACKGROUND OF THE INVENTION

The present invention relates to an air cleaner for an internal combustion engine.

An air cleaner for filtering intake air is provided in the intake passage of an internal combustion engine (for example, Japanese Laid-Open Patent Publication No. 2007-32409). The air cleaner disclosed in the publication includes a first housing, which has an opening and an inlet port, and a second housing, which has an opening facing the opening of the first housing and an outlet port. Also, a filter element is provided between the opening of the first housing and the opening of the second housing.

The air cleaner of the publication includes an adsorption member for adsorbing fuel vapor of the internal combustion engine on the inner surface of the second housing. A gap exists between the inner surface and the adsorbing member. Specifically, the adsorption member has an adsorption sheet containing activated carbon or the like for adsorbing fuel vapor and a frame provided at the periphery of the adsorption sheet. The adsorption member is attached to the second housing by fixing the frame to fixing pins protruding from the inner surface of the second housing.

With the air cleaner of the publication, fuel vapor flowing backward through the intake passage away from the combustion chamber is adsorbed by the adsorption member while the engine is in a stopped state. Further, during operation of the engine, the fuel component adsorbed by the adsorption member passes through the gap together with the intake air and is carried away toward the combustion chamber. This purges the adsorption member, so that the adsorption performance is restored.

Further, with the above-described air cleaner, since the adsorption member is provided along the inner surface of the second housing, the flow of intake air is less likely to be disturbed and the flow resistance is less likely to be increased than in the configuration in which an adsorption member is provided along the cross section of the flow path of the intake air.

In the case of the air cleaner described in Japanese Laid-Open Patent Publication No. 2007-32409, although the adsorption member is provided along the inner surface of the second housing, it is necessary to provide a gap between the adsorption member and the inner surface of the second housing so that the fuel component adsorbed by the adsorption member is carried away by the intake air. That is, the adsorption member must be arranged to be separated from the inner surface of the second housing. Thus, the adsorption member disturbs the flow of intake air, and it is difficult to suppress the increase in the flow resistance.

SUMMARY OF THE INVENTION

It is an objective of the present invention to provide an air cleaner for an internal combustion engine capable of improving the purging performance of an adsorbent while suppressing an increase in the flow resistance.

To achieve the foregoing objective, an air cleaner for an internal combustion engine is provided that includes a housing and a filter element. The housing has an inlet and an outlet. The filter element is provided in the housing. The housing includes a housing body, which has a wall portion formed of a plastic molding and is configured such that an opening is formed in a part of the wall portion, and an adsorption sheet, which is fixed to a peripheral portion of the opening and closes the opening. The adsorption sheet includes an outer fiber molding, an inner fiber molding, which is provided at a position inward of the outer fiber molding, and an adsorbent, which is located between the outer fiber molding and the inner fiber molding and adsorbs fuel vapor of the internal combustion engine.

DETAILED DESCRIPTION OF THE PREFERRED EMBODIMENTS

First Embodiment

A first embodiment will now be described with reference to FIGS. 1 to 4.

Figure 1:
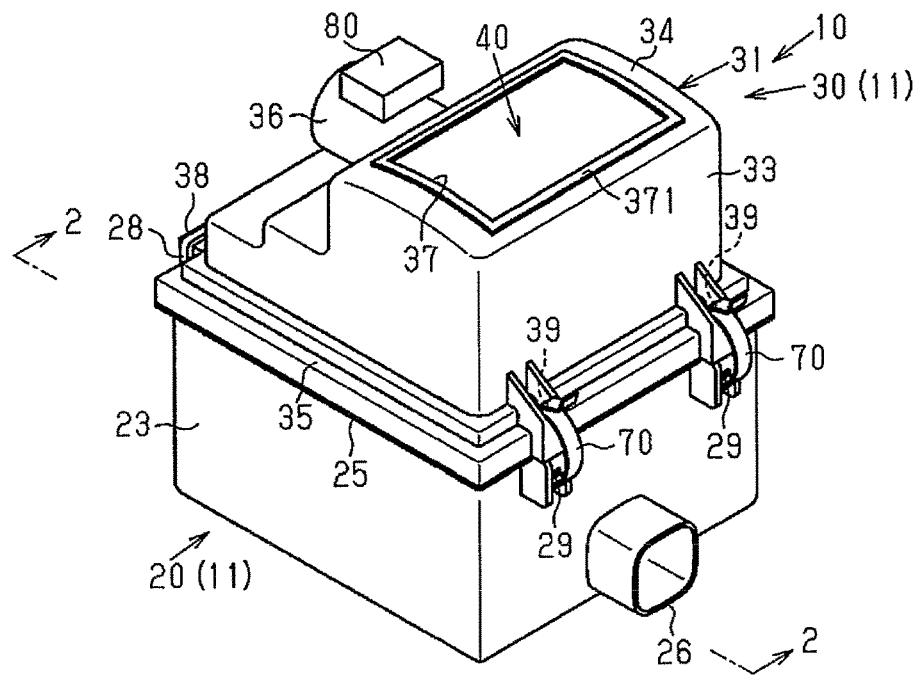
FIG. 1 is a perspective view from obliquely above, showing an air cleaner for an internal combustion engine according to a first embodiment.
Figure 2:
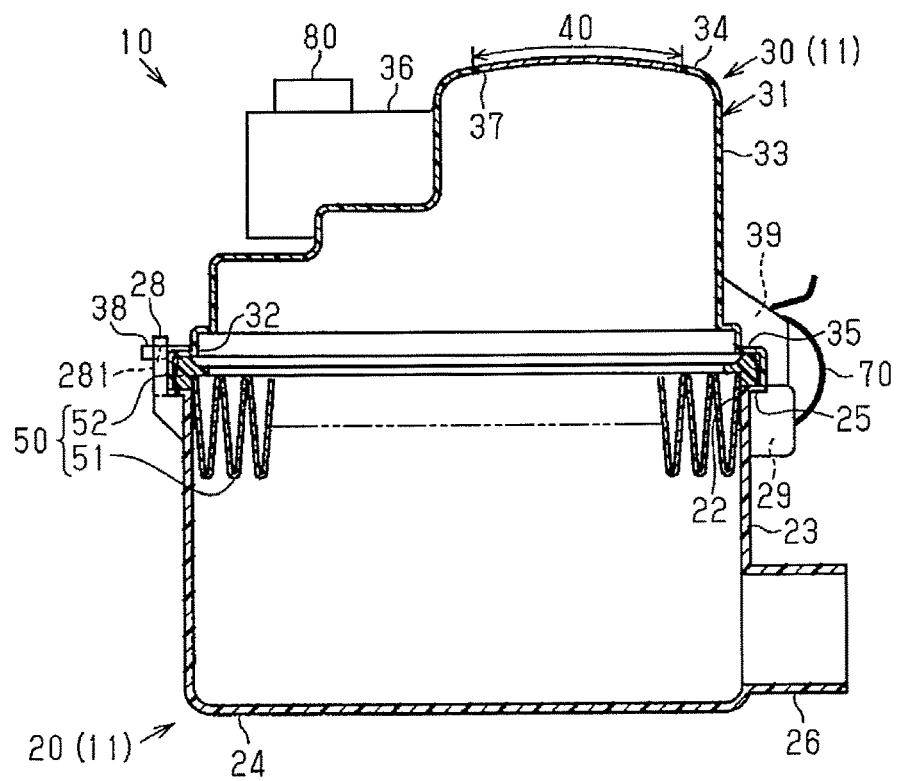
FIG. 2 is a cross-sectional view taken along line 2-2 of FIG. 1, showing the air cleaner.

As shown in FIGS. 1 and 2, an air cleaner 10 includes a housing 11 and a filter element 50 and is installed in the intake passage of a vehicle internal combustion engine. The housing 11 has an inlet 26 for introducing the intake air and an outlet 36 for discharging the intake air. A filter element 50 is provided inside the housing 11.

As shown in FIG. 2, the housing 11 includes a case 20 and a cap 30, which can be attached to and detached from the case 20.

<Case 20>

As shown in FIGS. 1 and 2, the case 20 has an opening 22, a peripheral wall 23 surrounding the opening 22, a bottom wall 24 on the side opposite to the opening 22, a flange 25 formed over the entire periphery of the opening 22, and the inlet 26 protruding outward from the peripheral wall 23.

On the outer surface of one side (the left side in FIG. 2) of the peripheral wall 23, a pair of arch portions 28 are formed at positions separated in the peripheral direction of the opening 22 (hereinafter referred to as peripheral direction). The arch portions 28 project upward and each have an engagement hole 281. In FIGS. 1 and 2, only one of the arch portions 28 is shown.

On the outer surface of the peripheral wall 23 opposite to the side on which the arch portions 28 are provided, or on the right side as viewed in FIG. 2, a pair of support portions 29 are provided at positions separated in the peripheral direction. The support portions 29 each tiltably support a clamp 70.

The case 20 is formed as a single component made of a hard plastic.

<Cap 30>

As shown in FIGS. 1 and 2, the cap 30 has an opening 32, a peripheral wall 33 surrounding the opening 32, a top wall 34 on the side opposite to the opening 32, a flange 35 formed over the entire periphery of the opening 32, and the outlet 36 protruding outward from the peripheral wall 33. In addition, the cap 30 has a cap body 31 made of a hard plastic material. That is, the cap body 31 is formed by a plastic molding. An air flowmeter 80 for detecting the flow rate of the intake air is attached to the outlet 36.

A pair of engaging projections 38 is formed at positions on the outer surface of the peripheral wall 33 that correspond to the arch portions 28 of the case 20. The engaging projections 38 are inserted into and engaged with engagement holes 281 of the arch portions 28, respectively. This constitutes a hinge mechanism with which the cap 30 is tiltably supported by the case 20. In FIGS. 1 and 2, only one of the arch portions 28 and one of the engaging projections 38 are shown.

A pair of catch portions 39 is formed at positions on the outer surface of the peripheral wall 33 that correspond to the support portions 29 (the clamps 70) of the case 20. The clamps 70, which are tiltably supported by the support portions 29, are respectively hooked to the catch portions 39, thereby constituting a fastening mechanism that fastens the cap 30 to the case 20.

In the present embodiment, the cap body 31 has an opening 37 having a rectangular shape in a plan view in a part of the top wall 34. An adsorption sheet 40 for closing the entire opening 37 is fixed to a peripheral portion 371 of the opening 37 in the top wall 34. FIG. 2 schematically illustrates the cross-sectional structure of the adsorption sheet 40 and its surroundings.

The configuration of the adsorption sheet 40 will now be described.

<Adsorption Sheet 40>

Figure 3:
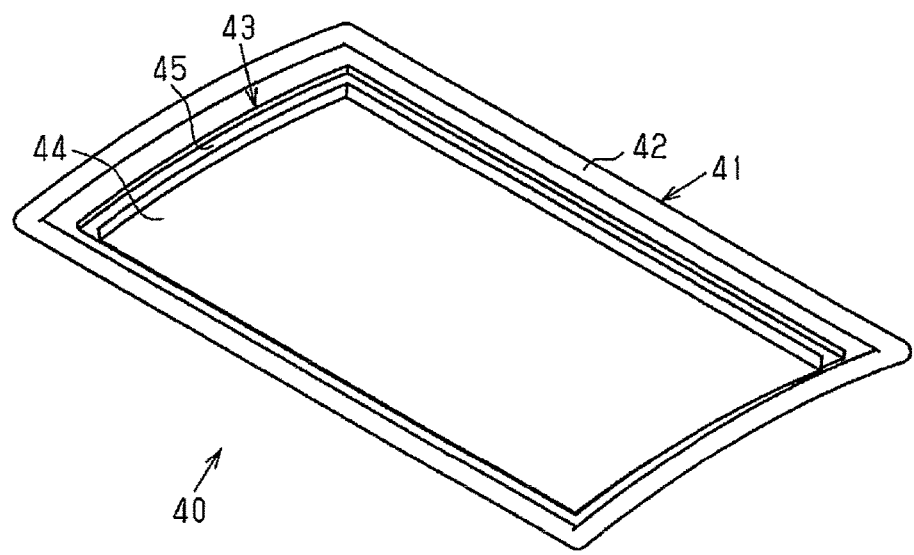
FIG. 3 is a perspective view from obliquely below, showing the adsorption sheet of the first embodiment.
Figure 4:
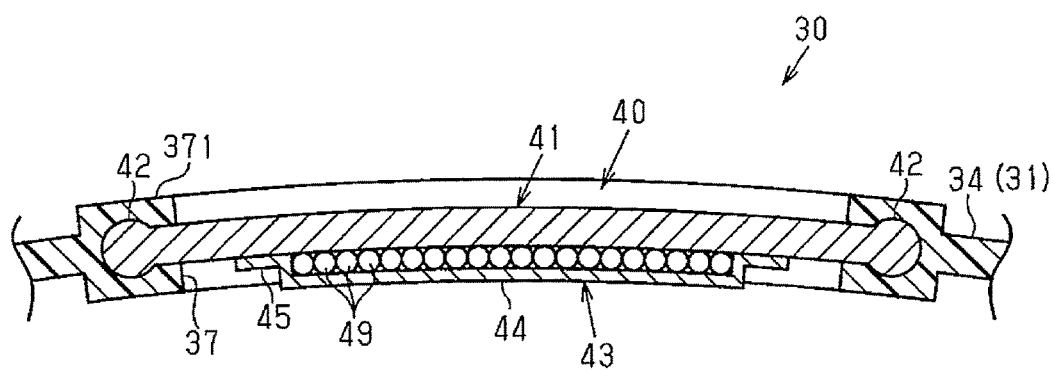
FIG. 4 is a partially enlarged cross-sectional view of a cap, mainly showing the adsorption sheet of FIG. 2.

As shown in FIGS. 3 and 4, the adsorption sheet 40 includes an outer fiber molding 41, an inner fiber molding 43, which is provided inside the outer fiber molding 41, and an adsorbent 49, which is arranged between the outer fiber molding 41 and the inner fiber molding 43. The adsorbent 49 adsorbs fuel vapor of the internal combustion engine.

Each of the fiber moldings 41, 43 has a base fiber made of a thermoplastic resin and a binder fiber made of a thermoplastic resin having a melting point lower than that of the base fiber. The binder fiber is thermally fused to the base fiber to bond the filaments in the base fiber together. In the present embodiment, polyethylene terephthalate (PET) is used as the base fiber, and modified PET is used as the binder fiber.

The compounding ratio of the binder fiber in each of the fiber moldings 41, 43 is preferably 30% to 70%. In the present embodiment, the compounding ratio of the binder fiber is set to 50%.

Each of the fiber moldings 41, 43 is formed by hot pressing a nonwoven fabric sheet composed of the base fiber and the binder fiber.

Next, the outer fiber molding 41 and the inner fiber molding 43 will be described in more detail.

<Outer Fiber Molding 41>

As shown in FIGS. 3 and 4, the outer peripheral edge 42 of the outer fiber molding 41 is in the shape of a rectangular sheet larger than the inner peripheral edge of the opening 37.

As shown in FIG. 4, the outer peripheral edge 42 of the outer fiber molding 41 is wrapped by the peripheral portion 371 of the opening 37 in the cap body 31 over the entire periphery, so that the outer fiber molding 41 is fixed to the cap body 31.

The packing density (the degree of compression) of the fibers of the outer peripheral edge 42 of the outer fiber molding 41 is set to be lower than the packing density (the degree of compression) of the fibers of the other part of the outer fiber molding 41 that is not wrapped by the peripheral portion 371.

It is preferable that the weight per unit area of the outer fiber molding 41 is from 300 to 1500 $g/m^2$ (square meter). In the present embodiment, the weight per unit area of the outer fiber molding 41 is set to 800 $g/m^2$.

The thickness of the outer fiber molding 41 is preferably from 0.5 to 3.0 mm. In the present embodiment, the thickness of the outer fiber molding 41 is set to 1.5 mm.

<Inner Fiber Molding 43>

As shown in FIGS. 3 and 4, an outer peripheral edge 45 of the inner fiber molding 43 is in the shape of a rectangular sheet slightly smaller than the outer peripheral edge 42 of the outer fiber molding 41. The inner fiber molding 43 has a holding portion 44 in the central part. The holding portion 44 is opposed to the outer fiber molding 41 at a distance, and the holding portion 44 and the outer fiber molding 41 hold the adsorbent 49 in between.

The outer peripheral edge 45 of the inner fiber molding 43 is joined to a section of the outer fiber molding 41 that is further inward in the opening 37 than the outer peripheral edge 42 of the outer fiber molding 41, which is wrapped by the peripheral portion 371 of the opening 37 in the cap body 31.

The outer fiber molding 41 and the inner fiber molding 43 are joined together via the respective binder resins.

It is preferable that the weight per unit area of the inner fiber molding 43 is 30 to 150 $g/m^2$ (square meter). In the present embodiment, the weight per unit area of the inner fiber molding 43 is set to 60 $g/m^2$.

The thickness of the inner fiber molding 43 is preferably from 0.1 to 1.5 mm. In the present embodiment, the thickness of the inner fiber molding 43 is set to 0.3 mm.

The adsorbent 49 is preferably, for example, granular activated carbon.

In the present embodiment, the cap body 31 is formed into a single component by inserting the adsorption sheet 40 thereinto.

<Filter Element 50>

As shown in FIG. 2, the filter element 50 includes a filtration portion 51 and an annular sealing portion 52. The filtration portion 51 is formed by pleating a filtering material sheet. The sealing portion 52 is provided at the peripheral edge of the filtration portion 51. The filtering material sheet is made of, for example, nonwoven fabric or filter paper. The sealing portion 52 is made of elastic foam such as closed-cell polyurethane.

With the filtration portion 51 accommodated between the opening 22 of the case 20 and the opening 32 of the cap 30, which faces the opening 22, the sealing portion 52 is tightly held by the flange 25 of the case 20 and the flange 35 of the cap 30, so that the sealing portion 52 seals against the cap 30.

The operation of the present embodiment will now be described.

During stoppage of the engine, fuel vapor flowing backward through the intake passage away from the combustion chamber fills the cap 30 through the outlet 36. Then, the fuel vapor is adsorbed by the adsorbent 49 of the adsorption sheet 40, which constitutes the top wall 34 of the cap 30.

During the subsequent operation of the engine, the fuel component adsorbed by the adsorbent 49 is carried away by a small amount of air that is drawn in from the outside through the outer fiber molding 41 by the negative pressure in the intake pipe. This promotes the purge of adsorbent 49.

Furthermore, since the adsorption sheet 40 constitutes the top wall 34 of the cap 30, it is possible to suppress the increase in the flow resistance in the cap 30 by the adsorption sheet 40.

Also, in the air cleaner 10 of the present embodiment, the opening 37 is formed in a part of the top wall 34 of the cap body 31, and the opening 37 is closed by the adsorption sheet 40, that is, by the air permeable fiber moldings 41, 43. Thus, a part of the sound waves of the intake noise in the housing 11 passes through the fiber moldings 41, 43, which suppresses the generation of the standing wave of the intake noise. It is also possible to reduce the energy of the intake noise by causing the fibers constituting the fiber moldings 41, 43 to resonate by the sound waves of the intake noise. Therefore, the intake noise can be reduced while ensuring the stiffness of the cap 30 by the peripheral wall 33 and the top wall 34, which are formed by the plastic moldings.

The air cleaner for an internal combustion engine according to the above-described embodiment achieves the following advantages.

(1) The cap 30 of the air cleaner 10 includes the cap body 31 and the adsorption sheet 40. The cap body 31 has the peripheral wall 33 and the top wall 34, which are formed by plastic moldings. The cap body 31 is configured such that the opening 37 is formed in a part of the top wall 34. The adsorption sheet 40 is fixed to the peripheral portion 371 of the opening 37 and closes the opening 37. The adsorption sheet 40 includes an outer fiber molding 41, an inner fiber molding 43, which is provided inside the outer fiber molding 41, and an adsorbent 49, which is arranged between the outer fiber molding 41 and the inner fiber molding 43. The adsorbent 49 adsorbs fuel vapor of the internal combustion engine.

Since this configuration operates in the above-describe manner, it is possible to suppress the increase in the flow resistance while improving the purging performance of the adsorbent 49.

Also, with the above-described configuration, the intake noise can be reduced while ensuring the stiffness of the cap 30 by the peripheral wall 33 and the top wall 34, which are formed by plastic moldings.

(2) The adsorption sheet 40 is provided on the cap body 31, which constitutes the clean side of the housing 11. Therefore, the adsorption sheet 40 effectively adsorbs fuel vapor.

It is conceivable to further reduce the intake noise by forming the entire wall portion of the cap by fiber molding. However, in this case, the flow of intake air from the inlet 26 to the outlet 36 may be disturbed by the air flowing from the outside through fiber molding due to the negative pressure in the intake pipe during the operation of the engine. This may adversely affect the detection property of the air flowmeter 80, which detects the flow rate of the intake air at the outlet 36.

In this regard, in the air cleaner 10 of the present embodiment, the opening 37 is formed in a part of the top wall 34 of the cap body 31, and the opening 37 is closed by the adsorption sheet 40. In addition, the adsorption sheet 40 includes the outer fiber molding 41, the adsorbent 49, and the inner fiber molding 43. Accordingly, during the engine operation, the air drawn in from the outside through the adsorption sheet 40 by the negative pressure in the intake pipe is adequately limited. Therefore, it is possible to prevent the drawn-in air from disturbing the flow of the intake air flowing from the inlet 26 to the outlet 36 and adversely affecting the detection property of the air flowmeter 80.

(3) The inner fiber molding 43 has the holding portion 44 and the outer peripheral edge 45. The holding portion 44 is opposed to the outer fiber molding 41 at a distance, and the holding portion 44 and the outer fiber molding 41 hold the adsorbent 49 in between. The outer peripheral edge 45 is located on the outer side of the holding portion 44 and joined to the outer fiber molding 41.

With this configuration, a space for holding the adsorbent 49 is formed between the holding portion 44 of the inner fiber molding 43 and the outer fiber molding 41. Therefore, when joining the inner fiber molding 43 and the outer fiber molding 41, it is only necessary to press the outer peripheral edge 45 of the inner fiber molding 43 against the outer fiber molding 41, and almost no load needs to be applied to the adsorbent 49. Therefore, cracking of the adsorbent 49 can be reliably avoided.

(4) The outer peripheral edge 42 of the outer fiber molding 41 is wrapped by the peripheral portion 371 of the opening 37 in the cap body 31, so that the outer fiber molding 41 is fixed to the cap body 31. The packing density of the fibers of the outer peripheral edge 42 of the outer fiber molding 41 is set to be lower than the packing density of the fibers of the other part of the outer fiber molding 41 that is not wrapped by the peripheral portion 371.

With this configuration, the packing density of the fibers of the outer peripheral edge 42 of the outer fiber molding 41 is set to be lower than the packing density of the fibers of the other parts. Thus, the outer peripheral edge 42 of the outer fiber molding 41 is more likely to be impregnated with molten plastic when the cap body 31 is molded with plastic while inserting the outer fiber molding 41. This firmly joins the outer peripheral edge 42 of the outer fiber molding 41 to the peripheral portion 371 of the opening 37 of the cap body 31 by the anchor effect. Therefore, it is possible to reliably secure the outer fiber molding 41 to the peripheral portion 371 of the cap body 31.

(5) The outer peripheral edge 45 of the inner fiber molding 43 is joined to a section of the outer fiber molding 41 that is further inward in the opening 37 than the outer peripheral edge 42 of the outer fiber molding 41, which is wrapped by the peripheral portion 371 of the opening 37 in the cap body 31.

When molding the cap body 31 with plastic while inserting both the outer fiber molding 41 and the inner fiber molding 43, plastic in a molten state flows into the space between the outer fiber molding 41 and the inner fiber molding 43, so that there is a possibility that a gap is created between the outer fiber molding 41 and the inner fiber molding 43 and peeling may occur.

The occurrence of such an inconvenience is avoided in the above-described configuration since the outer peripheral edge 45 of the inner fiber molding 43 is not wrapped in the peripheral portion 371 of the opening 37 of the cap body 31.

Second Embodiment

A second embodiment will now be described with reference to FIGS. 5 to 7.

Figure 5:
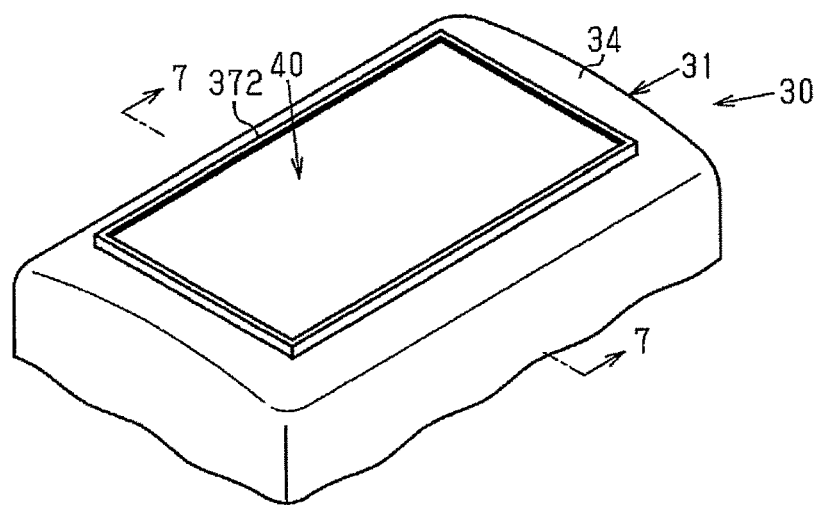
FIG. 5 is a perspective view from obliquely above, showing the top wall of the cap of an air cleaner according to a second embodiment.
Figure 6:
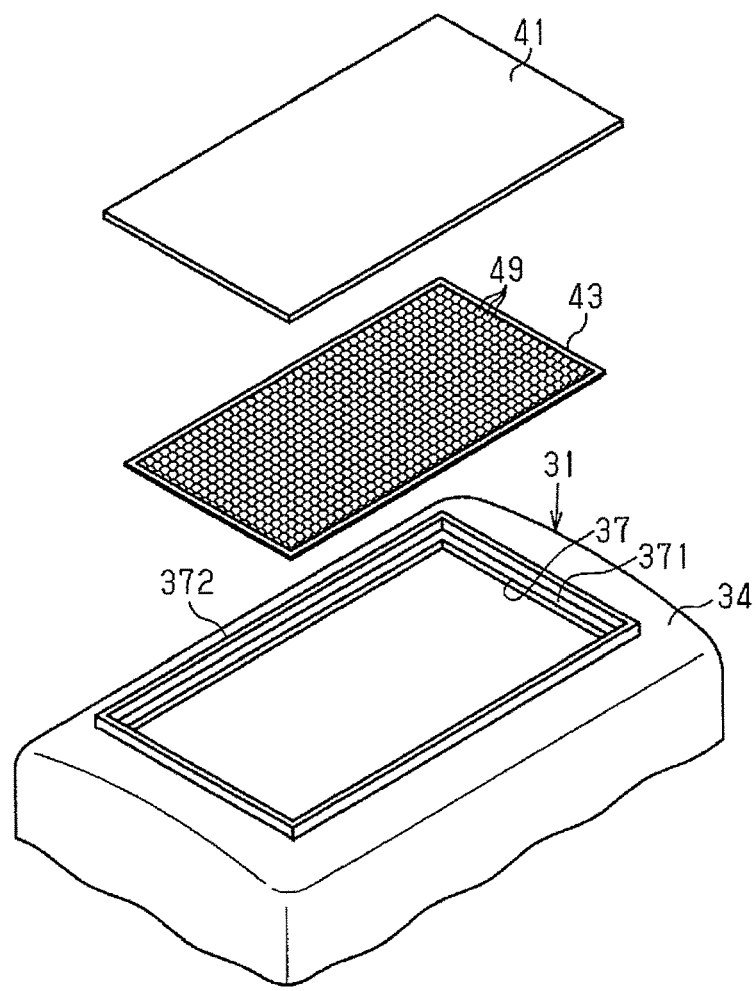
FIG. 6 is an exploded perspective view of the cap body, the inner fiber molding, the outer fiber molding, which constitute the top wall of the cap of the second embodiment.
Figure 7:
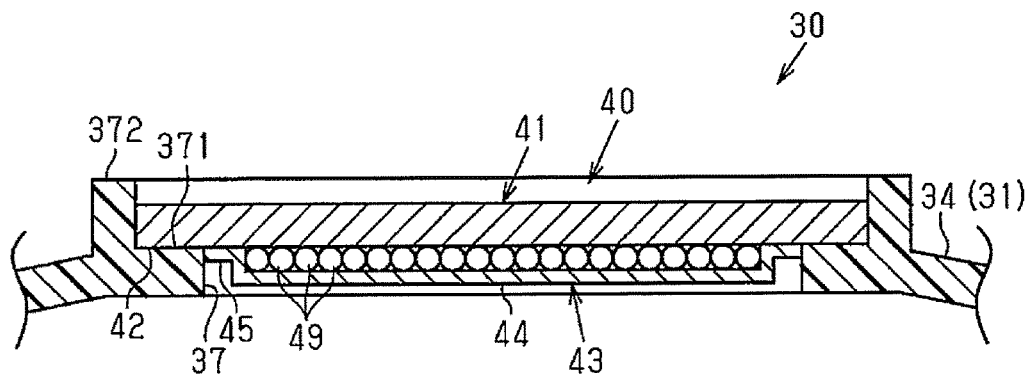
FIG. 7 is a cross-sectional view taken along line 7-7 of FIG. 5, showing the cap.

As shown in FIGS. 5 to 7, the cap body 31 of the present embodiment has a rectangular loop-shaped protrusion 372 on the outer surface of the top wall 34. The protrusion 372 surrounds the peripheral portion 371 of the opening 37. The outer peripheral edge 42 of the outer fiber molding 41, which constitutes the adsorption sheet 40, is bonded with adhesive to the outer surface of the peripheral portion 371 surrounded by the protrusion 372.

The present embodiment is different from the first embodiment in that the entire outer fiber molding 41 is formed by being uniformly hot pressed, and that the packing density of the fibers of the outer peripheral edge 42 is lower than the packing density of the fibers of the other portions.

As shown in FIG. 7, the inner surface of the holding portion 44 of the inner fiber molding 43 is located outward of the inner surface of the part of the top wall 34 of the cap body 31 that is adjacent to the inner fiber molding 43.

The air cleaner for an internal combustion engine according to the present embodiment achieves the following operational advantages.

(6) The outer peripheral edge 42 of the outer fiber molding 41 is joined to the outer surface of the peripheral portion 371 of the opening 37 in the cap body 31.

With this configuration, the outer peripheral edge 42 of the outer fiber molding 41, that is, the adsorption sheet 40, can be easily joined to the outer surface of the peripheral portion 371 of the preformed cap body 31 with adhesive.

With the above configuration, since the adsorption sheet 40 is located outward of the peripheral portion 371 of the cap body 31, it is possible to reliably prevent the adsorption sheet 40 from being drawn inward by the negative pressure in the intake pipe.

(7) The inner surface of the inner fiber molding 43 is located outward of the inner surface of the part of the top wall 34 of the cap body 31 that is adjacent to the inner fiber molding 43.

With this configuration, since the inner surface of the inner fiber molding 43 does not protrude further inward than the inner surface of the top wall 34, it is possible to reliably avoid the increase in the flow resistance in the cap 30.

<Modifications>

The above described embodiments may be modified as follows.

In the second embodiment, the outer peripheral edge 45 of the inner fiber molding 43 may be aligned with the outer peripheral edge 42 of the outer fiber molding 41, and the outer peripheral edge 45 of the inner fiber molding 43 may be aligned with the outer surface of the peripheral portion 371 of the opening 37 of the cap body 31.

In the second embodiment, the inner surface of the holding portion 44 of the inner fiber molding 43 may be aligned with the inner surface of the part of the top wall 34 of the cap body 31 that is adjacent to the inner fiber molding 43. Also, the inner surface of the holding portion 44 of the inner fiber molding 43 may be provided to protrude further inward than the inner surface of the part of the top wall 34 of the cap body 31 that is adjacent to the inner fiber molding 43. Even in this case, it is possible to suppress the increase in the flow resistance caused by the adsorption sheet, as compared with a configuration in which the adsorption member is arranged to be separated from the inner surface of the housing as in the air cleaner described in Japanese Laid-Open Patent Publication No. 2007-32409.

Figure 8:
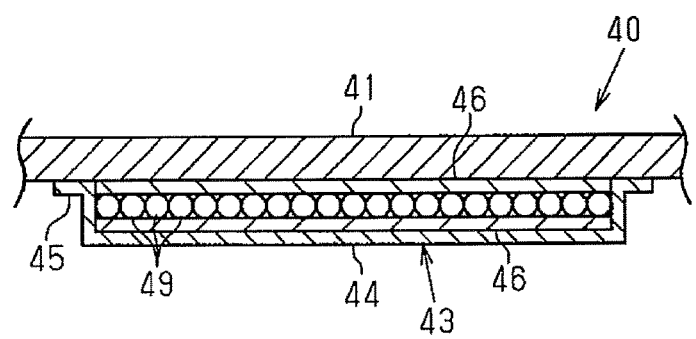
FIG. 8 is a cross-sectional view of an adsorption sheet of a first modification.

As shown in FIG. 8, the adsorbent 49 may be sandwiched from outside and inside by a pair of net members 46 made of glass fiber so as to be located between the outer fiber molding 41 and the inner fiber molding 43.

Figure 9:
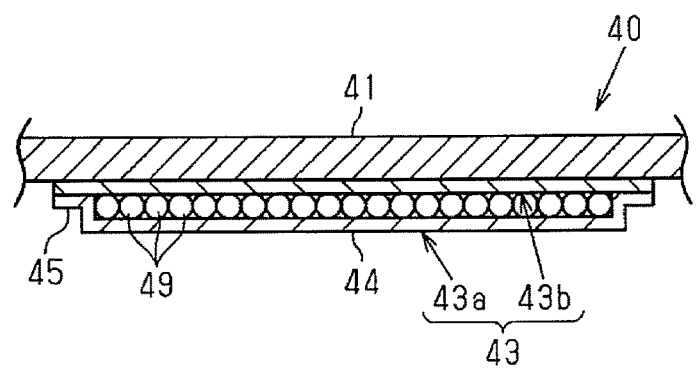
FIG. 9 is a cross-sectional view of an adsorption sheet of a second modification.

The inner fiber molding 43 may be formed into a bag shape and the adsorbent 49 may be accommodated therein. That is, as shown in FIG. 9, the inner fiber molding 43 has an inner portion 43a and an outer portion 43b, which is stacked on the outer side of the inner portion 43a. In a state in which the adsorbent 49 is accommodated between the inner portion 43a and the outer portion 43b, the peripheries of the inner portion 43a and the outer portion 43b are joined together over the entire periphery. The outer surface of the outer portion 43b is joined to the outer fiber molding 41.

Figure 10:
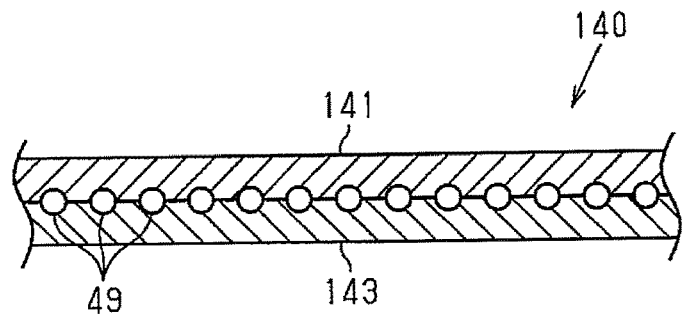
FIG. 10 is a cross-sectional view of an adsorption sheet of a third modification.

The inner fiber molding 43 does not necessary include the holding portion 44, which is opposed to the outer fiber molding 41 at a distance and holds the adsorbent 49 between the holding portion 44 and the outer fiber molding 41. For example, a configuration shown in FIG. 10 may be used in which an adsorption sheet 140 has an outer fiber molding 141 and an inner fiber molding 143, which is stacked on the entire inner surface of the outer fiber molding 141. In this case, granular adsorbent 49 is arranged in a dispersed manner between the inner surface of the outer fiber molding 141 and the outer surface of the inner fiber molding 143.

Figure 11:
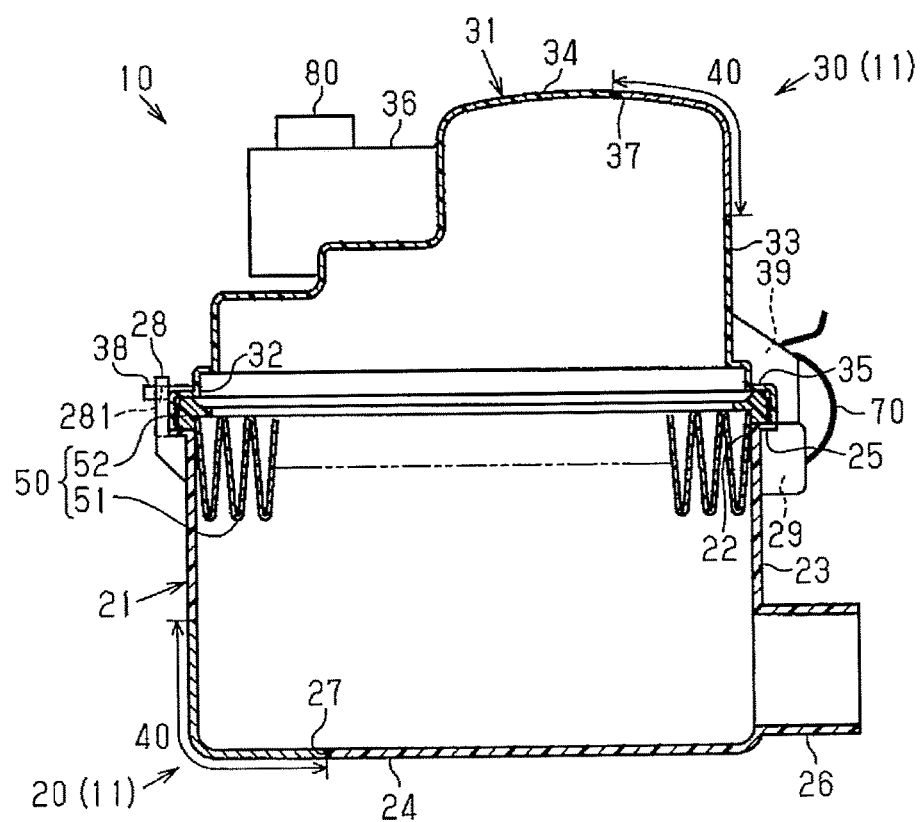
FIG. 11 is a cross-sectional view at a position corresponding to FIG. 2, showing an air cleaner of a modification.

As shown in FIG. 11, the opening 37 of the cap body 31 may be formed from the top wall 34 to the peripheral wall 33 opposed to the outlet 36, and the adsorption sheet 40 may be provided to close the opening 37. In this case, a part of the corner portion of the wall portion of the cap 30 is constituted by the adsorption sheet 40.

In addition, as shown in FIG. 11, the case 20 may have a case body 21, which has a wall portion formed of a plastic molding and is formed to have an opening 27 in a part of the wall portion, and an adsorption sheet 40, which is fixed to the peripheral portion of the opening 27 so as to close the opening 27. In this case, the case body 21 has a peripheral wall 23, a bottom wall 24, a flange 25, and an inlet 26, and is formed into a single component made of a hard plastic. The opening 27 is formed from the bottom wall 24 of the case body 21 to the peripheral wall 23 opposed to the inlet 26. The adsorption sheet 40 is fixed to the peripheral portion of the opening 27 in the peripheral wall 23 and the bottom wall 24. A part of the corner portion of the wall portion of the case 20 is constituted by the adsorption sheet 40.

In the air cleaner 10, the sound pressure of the intake noise tends to be high at the corner portions of the housing 11. In this respect, with the above configuration, the openings 27, 37 are formed at the corner portions of the case body 21 and the cap body 31, respectively, and the openings 27, 37 are closed by the adsorption sheet 40, that is, the air permeable fiber moldings. This effectively reduces the intake noise.

Openings may be formed in the peripheral wall 23 of the case body 21 and the peripheral wall 33 of the cap body 31, and an adsorption sheet may be provided to close these openings.

The invention claimed is:

1. An air cleaner for an internal combustion engine, comprising:
   a housing having an inlet and an outlet; and
   a filter element provided in the housing, wherein
   the housing includes a housing body, which has a wall portion formed of a plastic molding and is configured such that an opening is formed in a part of the wall portion, and an adsorption sheet, which is fixed to a peripheral portion of the opening and closes the opening, and the adsorption sheet includes an outer fiber molding, an inner fiber molding, which is provided at a position inward of the outer fiber molding, and an adsorbent, which is located between the outer fiber molding and the inner fiber molding and adsorbs fuel vapor of the internal combustion engine, and the inner fiber molding includes a holding portion, which is opposed to the outer fiber molding at a distance, and the holding portion and the outer fiber molding hold the adsorbent in between, and an outer peripheral edge, which is located outward of the holding portion and is joined to the outer fiber molding.

2. The air cleaner for an internal combustion engine according to claim 1, wherein the housing includes a case, which has an opening and the inlet, and a cap, which has the outlet and an opening facing the opening of the case, the filter element is located between the opening of the case and the opening of the cap, and the cap includes a cap body, which has a wall portion formed of a plastic molding and is configured such that an opening is formed in a part of the wall portion, and the adsorption sheet.

3. The air cleaner for an internal combustion engine according to claim 1, wherein an outer peripheral edge of the outer fiber molding is wrapped by the peripheral portion of the opening in the housing body, so that the outer fiber molding is fixed to the housing body, and a packing density of fibers of the outer peripheral edge of the outer fiber molding is set to be lower than a packing density of fibers of other part of the outer fiber molding that is not wrapped by the peripheral portion.

4. The air cleaner for an internal combustion engine according to claim 3, wherein the outer peripheral edge of the inner fiber molding is joined to a part of the outer fiber molding that is located further inward in the opening in the housing body than the outer peripheral edge of the outer fiber molding, which is wrapped by the peripheral portion of the opening in the housing body.

5. The air cleaner for an internal combustion engine according to claim 1, wherein the outer peripheral edge of the outer fiber molding is joined to an outer surface of the peripheral portion of the opening in the housing body.

6. The air cleaner for an internal combustion engine according to claim 1, wherein an inner surface of the inner fiber molding is aligned with or located outward of an inner surface of a part of the wall portion of the housing body that is adjacent to the inner fiber molding.

* * * * *